(12) United States Patent
Fox

(10) Patent No.: US 7,770,341 B2
(45) Date of Patent: Aug. 10, 2010

(54) SUSPENDED ELECTRICAL SERVICE CONDUIT SYSTEM AND METHOD OF USE

(75) Inventor: Michael C. Fox, Mooresville, IN (US)

(73) Assignee: Ductcrete, Inc., Mooresville, IN (US)

( * ) Notice: Subject to any disclaimer, the term of this patent is extended or adjusted under 35 U.S.C. 154(b) by 0 days.

(21) Appl. No.: 12/414,754

(22) Filed: Mar. 31, 2009

(65) Prior Publication Data

US 2009/0188203 A1  Jul. 30, 2009

Related U.S. Application Data

(63) Continuation-in-part of application No. 11/366,905, filed on Mar. 3, 2006, now abandoned.

(51) Int. Cl.
*E04C 2/52* (2006.01)

(52) U.S. Cl. ............... 52/220.2; 52/220.6; 52/653.2; 248/58; 138/107; 138/158; 138/175

(58) Field of Classification Search ............... 52/220.1, 52/220.6, 246–249, 319, 326, 333, 340, 653.2, 52/220.2, 220.5; 138/106, 107, 110, 157, 138/158, 163, 172, 174, 175; 248/58, 59
See application file for complete search history.

(56) References Cited

U.S. PATENT DOCUMENTS

| | | | | |
|---|---|---|---|---|
| 3,676,967 A | * | 7/1972 | Frati | 52/220.2 |
| 4,314,775 A | * | 2/1982 | Johnson | 405/155 |
| 4,411,409 A | | 10/1983 | Smith | |
| 4,465,719 A | * | 8/1984 | Grice | 428/70 |
| 6,254,040 B1 | * | 7/2001 | Mc Grath | 248/62 |
| 6,609,343 B1 | * | 8/2003 | Litten | 52/653.2 |
| 6,764,105 B1 | | 7/2004 | Sorkin | |
| 6,974,232 B1 | | 12/2005 | Richardson | |
| 2001/0023568 A1 | * | 9/2001 | Edwards et al. | 52/649.1 |

* cited by examiner

*Primary Examiner*—Richard E Chilcot, Jr.
*Assistant Examiner*—William V Gilbert
(74) *Attorney, Agent, or Firm*—Woodard Emhardt Moriarty McNett & Henry LLP

(57) ABSTRACT

An electrical conduit encasement including a top section and bottom section secured together by mortar and adjacent encasements by mortar. A pair of vertically extending threaded rods suspend the concrete encasements with the rods extending through members attached to plates embededly attached to the encasements.

5 Claims, 8 Drawing Sheets

SUSPENDED ELECTRICAL SERVICE CONDUIT SYSTEM AND METHOD OF USE

This application is a continuation-in-part of application Ser. No. 11/366,905, filed Mar. 3, 2006 now abandoned, which is hereby incorporated by reference.

BACKGROUND OF THE INVENTION

1. Field of the Invention

The present invention is generally related to the building and electrical service conductor arts.

2. Description of the Prior Art

In accordance with the National Electrical Code, hereinafter "NEC", electrical service conductors must be positioned so as not to pass through the interior of a building. Electrical service conductors are considered to be outside of a building if they are confined by not less than two inches of brick or concrete. As shown in the Prior art drawing of FIG. 2, a building 100 is serviced via service conductors 101 and transformer 102. When new service conductors are installed, current practice requires tearing up the concrete floor 105, installing the service conductors, and reconstructing the floor. This is clearly a very costly and time-consuming process. Accordingly, it is an object of the present invention to set forth a novel system and method to avoid the above described costly process and still be within the requirements of the NEC.

The invention demonstrates a specially designed encasement system which may be utilized, for example in the upper area 107 of FIG. 2. Disclosed herein is an electrical conduit encasement system which is designed to be suspended from a solid structural ceiling support of a building. My system and method may be economically manufactured and used for widespread commercial appeal in the building and electrical service arts.

Related U.S. Patents are cited as follows:

U.S. Pat. No. 4,411,409 showing plastic tubing with a concrete duct; U.S. Pat. No. 6,764,105 showing precast concrete ducting; and U.S. Pat. No. 6,974,232 describing a ducting sleeve having a nesting half-shell configuration.

SUMMARY OF THE INVENTION

An encasement system and method are provided which includes a lower encasement member and an upper mating encasement member. The encasement members are formed of foam impregnated lightweight concrete. A cradle supports the encasement members and is suspended from a solid structural ceiling element by a pair of rods.

The method steps broadly include the following:

1) Hang a lower encasement section from rods attached to a secure, solid ceiling area;

2) Install a PVC plastic conduit including at least one electrical service conductor; and 3) Install the upper encasement member.

DESCRIPTION OF THE PREFERRED EMBODIMENTS

Figure 1:
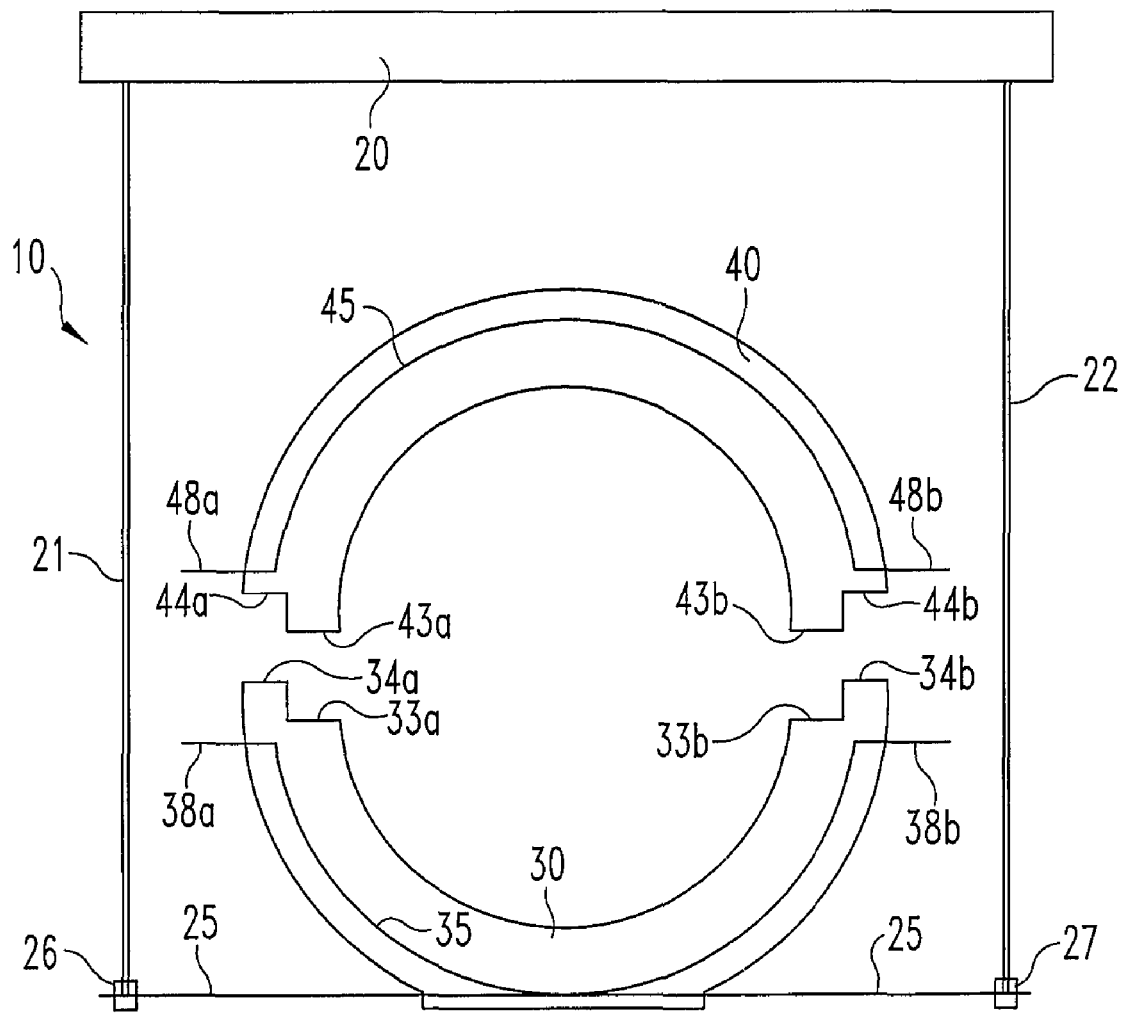
FIG. 1 is a side schematic view of the first alternate embodiment of the principal components of the invention and discloses the intended method of use.
Figure 2:
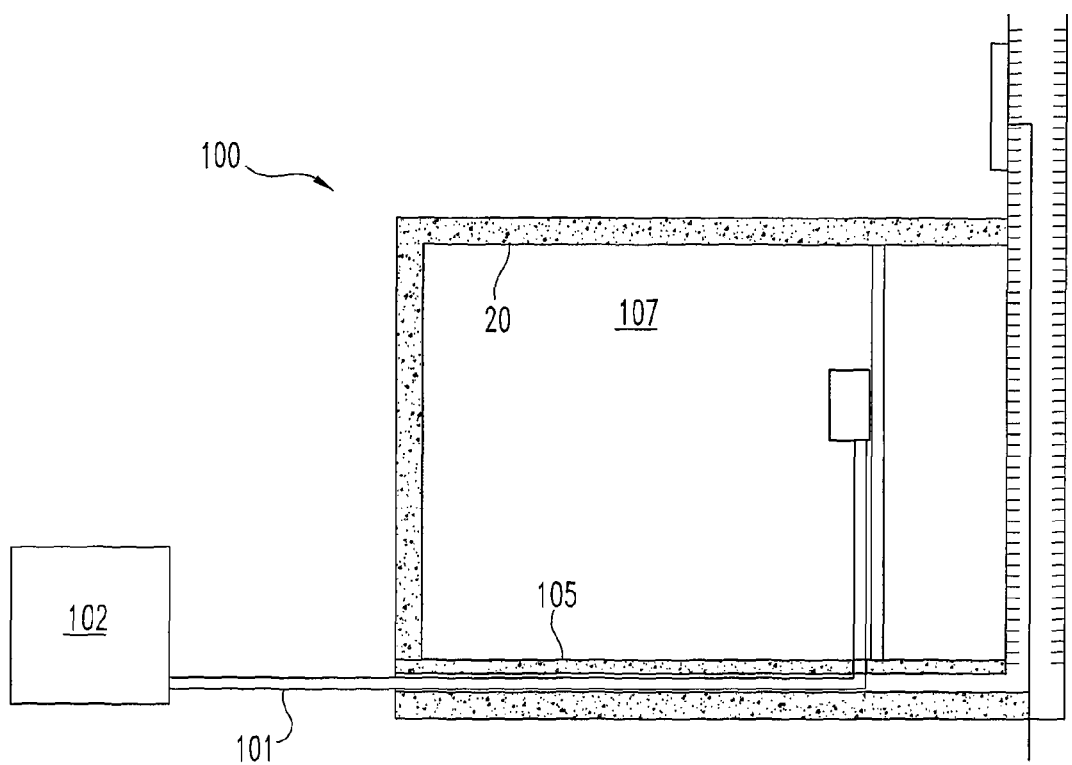
FIG. 2 is a side schematic view of a building having electrical service conductors being supplied via a transformer unit. The conventional prior art use is indicated as well as the area where the present invention may be advantageously utilized.

For the purposes of promoting an understanding of the principles of the invention, reference will now be made to the embodiment illustrated in the drawings and specific language will be used to describe the same. It will nevertheless be understood that no limitation of the scope of the invention is thereby intended, such alterations and further modifications in the illustrated device, and such further applications of the principles of the invention as illustrated therein being contemplated as would normally occur to one skilled in the art to which the invention relates.

Figure 3:
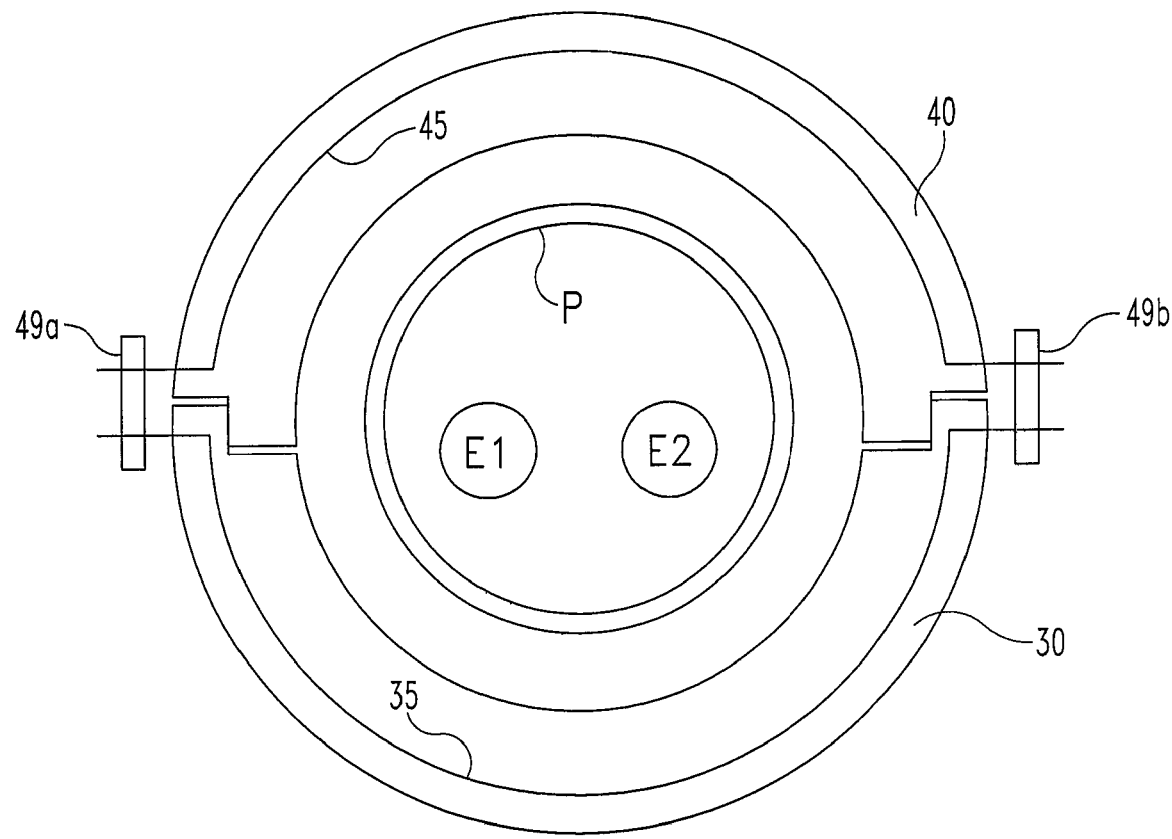
FIG. 3 is an enlarged cross-sectional view of the encasement shown mounted to the cradle of FIG. 1.

The first alternate embodiment of the present invention is shown in FIGS. 1 and 3 which depict the overall electrical service conduit system identified at 10.

Numeral 20 indicates an upper solid portion of the interior of a building to be serviced. Extending from the solid element 20 are plural rod elements 21 and 22. Rods 21 and 22 are attached to a lower plate means 25 by nut and washer units shown at 26 and 27. The lower plate 25 is part of a lower concrete encasement 30. The concrete used in unit 30 can be, for example, a type of foam impregnated lightweight concrete. The lower flat plate 25 has been weld-mounted to an upper curved plate 35. Concrete encasement section 30 is precast and is generally in the shape of a half clamshell for purposes to be further described. The lower concrete encasement section 30 has recessed area portions as indicated at numerals 33*a* and 33*b*. It further has protruding exterior portions as shown at numerals 34*a* and 34*b*.

The upper curved plate 35 terminates in horizontal ends 38*a* and 38*b*. respectively.

The system further includes an upper concrete encasement section 40. Encasement section 40 includes a curved reinforcing steel element 45 which terminates in horizontal end portions 48*a* and 48*b* respectively. The upper concrete encasement section 40 further includes outer recessed areas 44*a* and 44*b*. It also includes inner protruding portions 43*a* and 43*b*.

As shown in FIG. 3, the system includes an interior PVC plastic pipe indicated at letter P and at least one or more electrical supply lines as indicated at E1 and E2. Encasement section 40 is also in the shape of a half clamshell for mating with the lower encasement section 30. FIG. 3 shows schematically how the upper and lower encasement sections 30 and 40 are mated together via the recessed and protruding portions previously described. As further shown in FIG. 3, the horizontal portions of steel reinforcing bars 35 and 45 may be joined by means of bolts indicated schematically at numerals 49*a* and 49*b*.

The method steps utilized in practice of the invention are as follows:

a) suspending rod elements 21 and 22 from a secure and solid ceiling area 20;

b) attaching a lower encasement structure 30 to the suspended rods, the lower encasement structure having two reinforcing steel bars therein;

c) placing electrical conduit means in the system;

d) adding an upper encasement structure to the system in a sealing and mating fashion; and e) securing the upper encasement structure 40 to the lower encasement structure 30.

It is to be understood that the lower and upper encasement structures 30 and 40 are fabricated of pre-cast concrete and comprise a foam impregnated lightweight concrete. The lower encasement structure may have a flat lower side, as shown in FIG. 1, to accommodate parallel electrical supply runs where needed.

Figure 4:
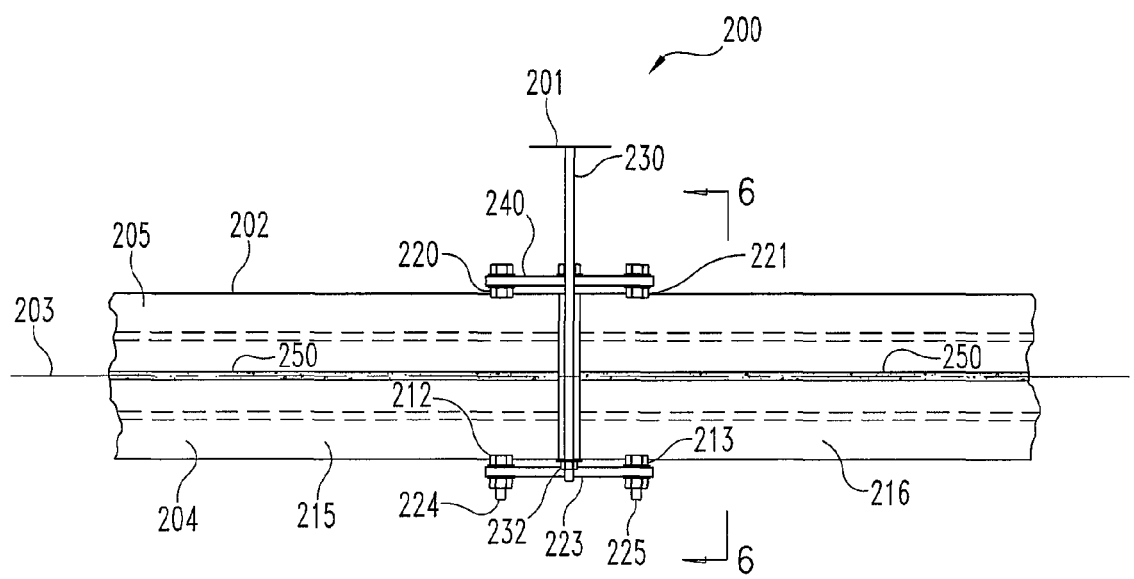
FIG. 4 is a fragmentary side view of a pair of concrete encasements suspended from a ceiling or other structure incorporating the preferred embodiment of the present invention.

The preferred embodiment of the present invention is shown in FIGS. 4-8. The conduit 200 is shown in FIG. 4 for holding electrical lines with the conduit suspendable from a ceiling or other structure 201. A first concrete encasement 202 having a longitudinal axis 203 includes a concrete bottom section 204 and a mating concrete top section 205. Sections 204 and 205 are joinable together forming an enclosure for holding an inner tube 206 (FIG. 6), in turn, being hollow for holding the plurality of electrical lines. The bottom section 204 has an outer flat bottom portion 207. Likewise, the top section 205 has an outer flat top portion 208 enabling the sections when joined together to be vertically stacked. For example, top encasement 211 (FIG. 7) is stacked atop bottom encasement 210 with the outer bottom flat portion 207 resting atop a supporting structure and with the bottom flat portion 207 of the top encasement 211 resting atop the top flat portion 208 of the bottom encasement 210. Further, the bottom section 204 is identical in construction and configuration to the top sections 205 allowing not only the vertical stacking shown in FIG. 7 but also allowing for interchange of sections as the concrete encasements are formed. That is, a single design of a section may be used for both the top and bottom half of the concrete encasement.

Each section 204, 205 has a pair of members or plates which extend perpendicularly across the longitudinal axis 203 with the plates connected or embedded in the concrete thereby fixedly attaching the plates to the concrete section. Thus, a pair of plates 212 and 213 (FIG. 5) extend across longitudinal axis 203 and are positioned at the bottom outer flat portion 207 of the bottom section of the concrete encasement. Each plate 212 and 213 has a plurality of holes 214 through which the concrete extends. The plates are positioned in a mold when the concrete is poured forming the section thereby allowing the concrete to extend through holes 214 with the concrete subsequently hardening thereby fixedly securing the plates to the concrete section. Both plates may be attached to a single section. Alternatively, a single plate may be attached to the end of one concrete section with the second plate attached to an adjacent section. For example, in FIG. 5, plate 212 extends across the longitudinal axis 203 of the concrete encasement 215 aligned with a second identical encasement 216 having plate 213 extending across axis 203 and being fixedly secured thereto.

The adjacent ends 217 and 218 of respectively concrete encasements 215 and 216 are aligned together with mortar 219 then being positioned between the adjacent ends with the mortar then hardening and attaching the adjacent ends and respective encasements together. Similarly, a pair of plates 220 and 221 (FIG. 4) extend perpendicularly across the longitudinal axis 203 of conduit 200 and are embedded on the outer flat top portion of the top sections of aligned and adjacent concrete encasements 215 and 216 in a manner identical to that described for plates 212 and 213.

A first member 222 and a second member 223 extend along longitudinal axis 203 and are parallel therewith being spaced apart from each other forming a channel sized to receive the concrete encasements 215 and 216. Members 222 and 223 are lower in elevation than the cross members 212 and 213 that extend perpendicular to axis 203. The opposite ends of plates 212 and 213 overlap the opposite ends of members 222 and 223 and are secured thereto by conventional fasteners. For example, conventional fasteners 224 and 225 extend through and connect together the opposite ends of member 223 to cross members 212 and 213 (FIG. 4).

Figure 5:
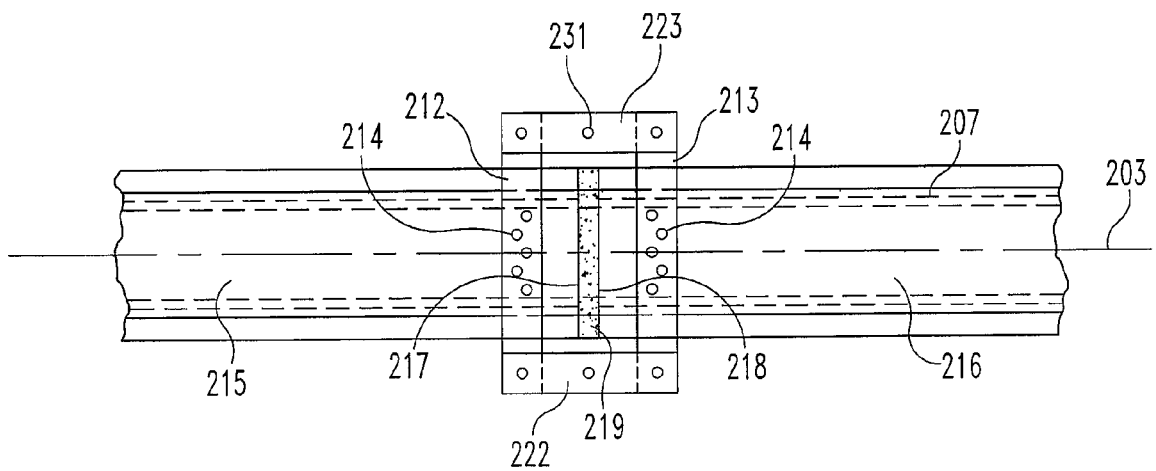
FIG. 5 is a bottom view of the encasements of FIG. 4.
Figure 6:
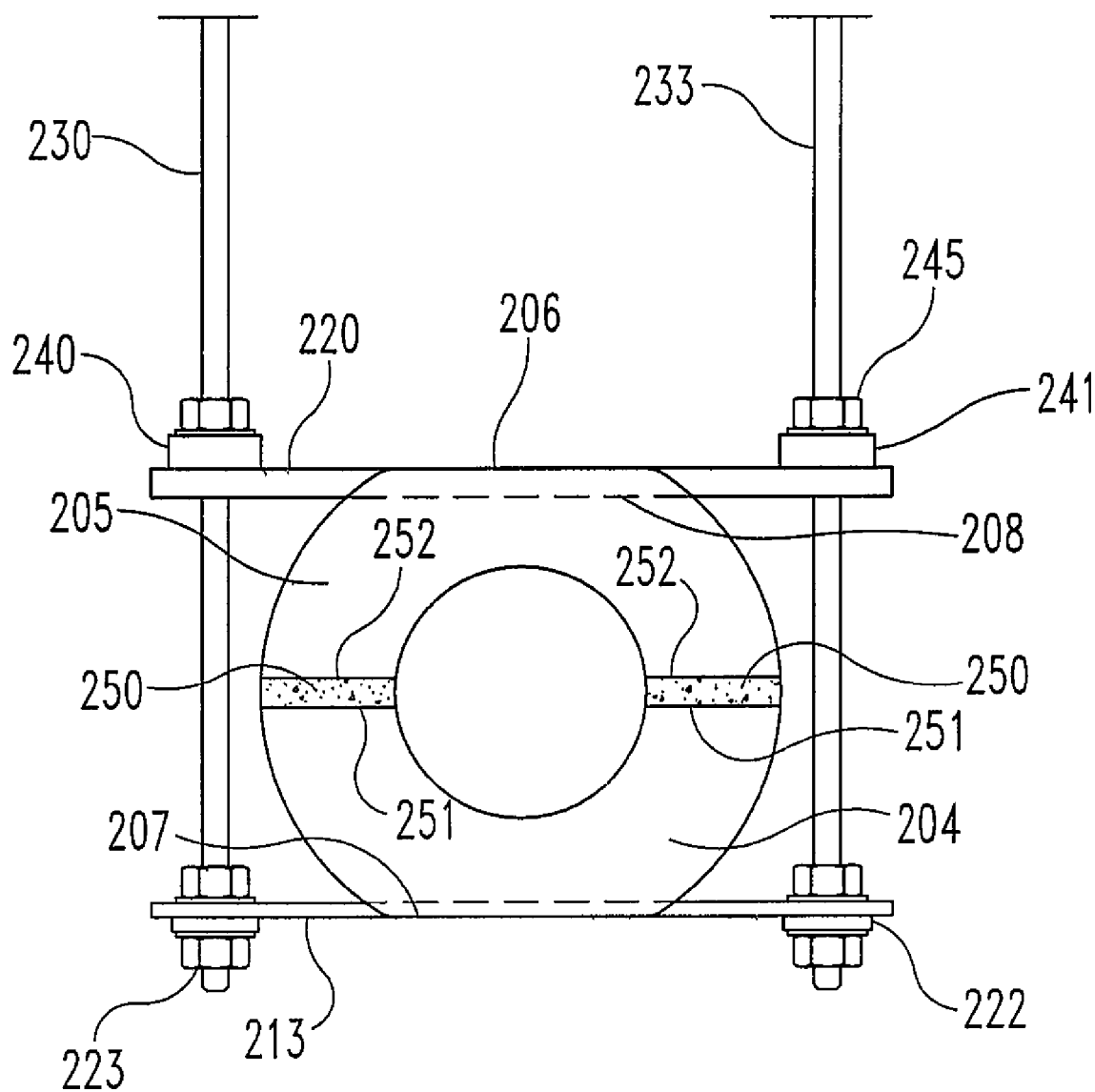
FIG. 6 is a cross-sectional view taken along the line 6-6 of FIG. 4 and viewed in the direction of the arrows.
Figure 7:
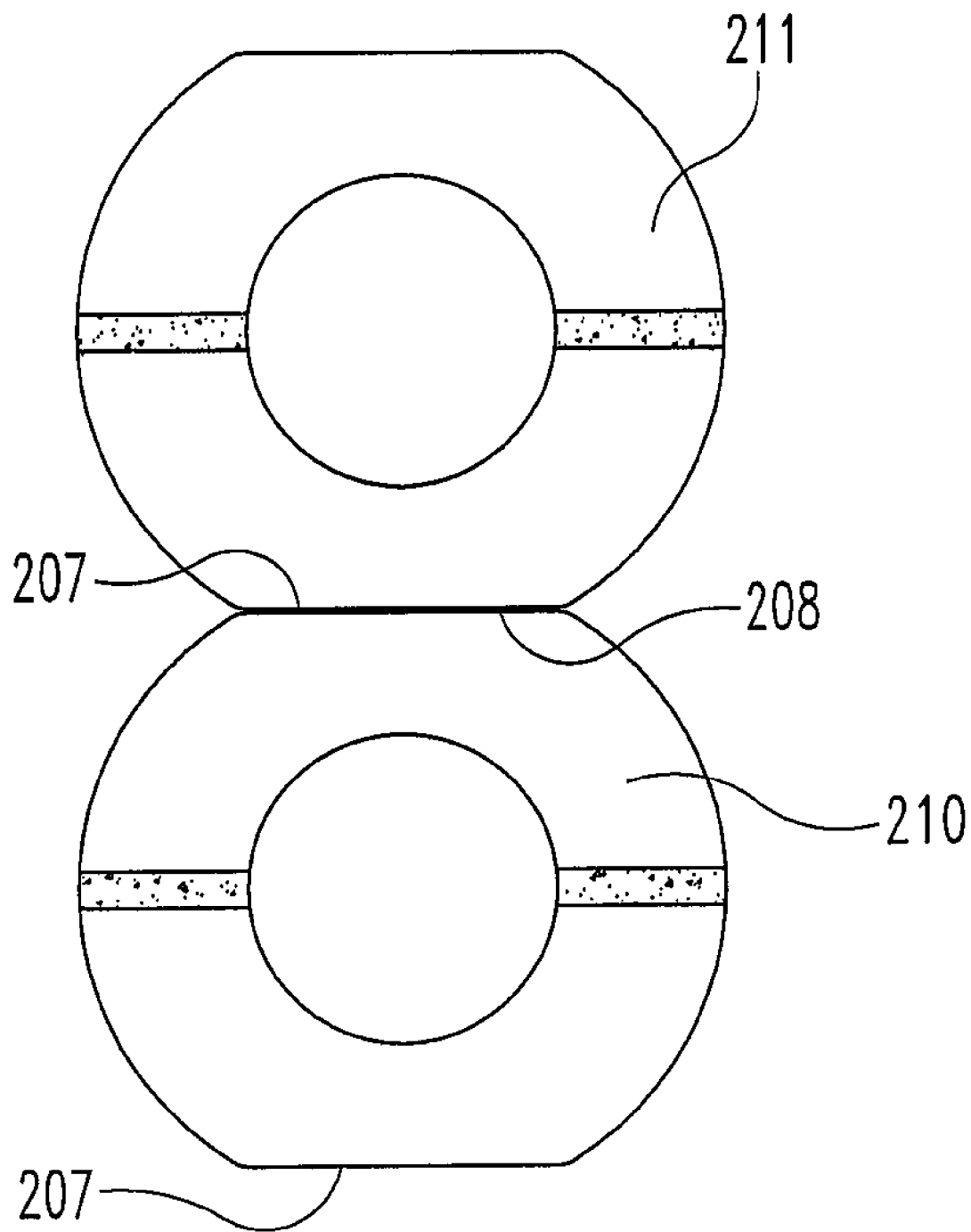
FIG. 7 is an end view of a pair of encasements incorporating the preferred embodiment stacked vertically.
Figure 8:
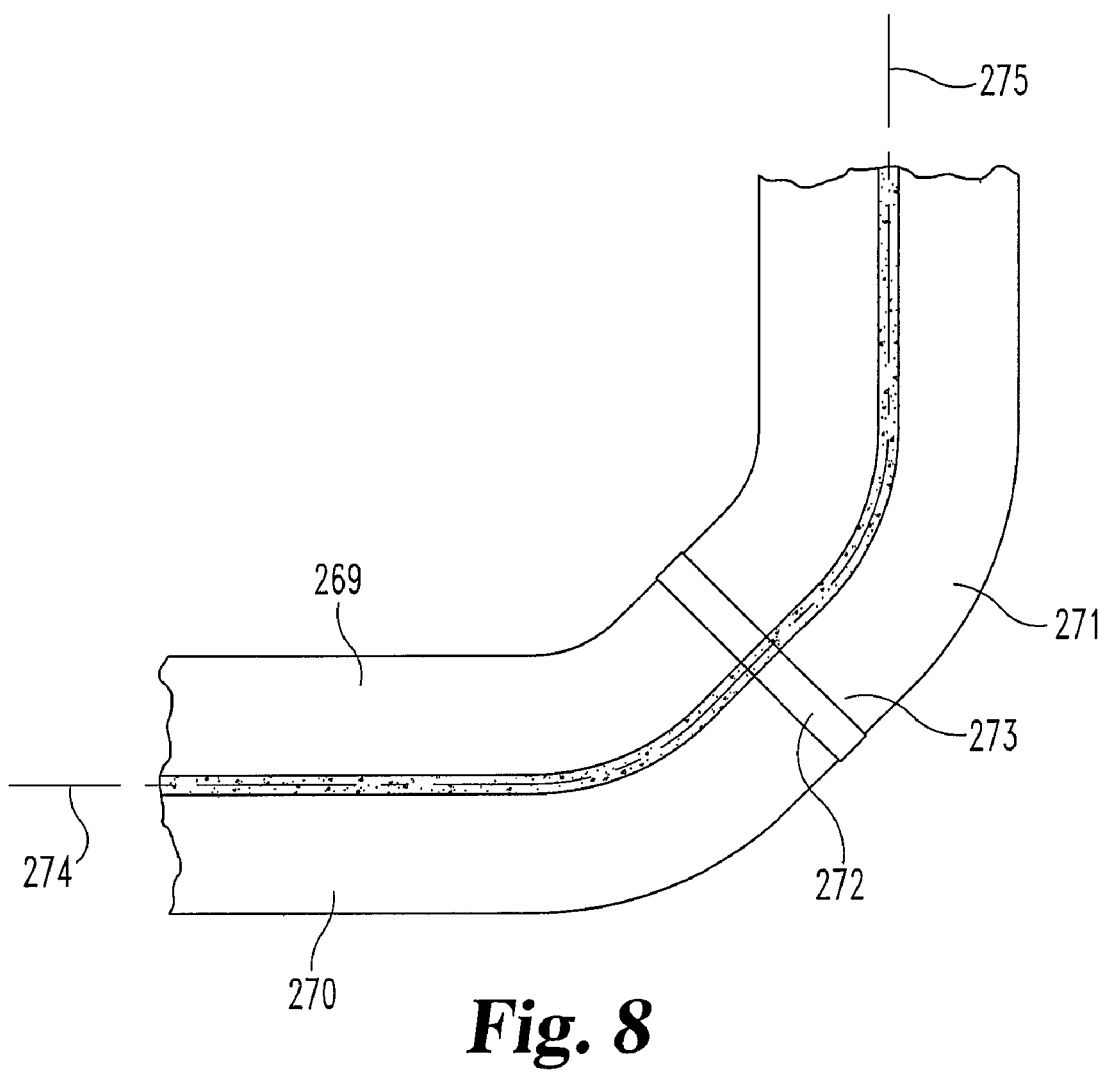
FIG. 8 is a fragmentary side view of a pair of encasements incorporating the preferred embodiment of the present invention and being connected together at a right angle.

Concrete encasements 215 and 216 are shown fragmented in FIGS. 4 and 5 and illustrate the positioning of cross members 212 and 213 embedded in the adjacent ends of the encasements. It is to be understood that identical plates are embedded in the opposite ends of encasements 215 and 216 to enable attachment with additional encasements aligned with encasements 215 and 216.

A hanger is connected to the members that extend in the direction of the longitudinal axis. The hangers include a pair of vertically extending spaced apart rods. Each rod includes external threads thereon to be secured by conventional fastening devices to members 222 and 223 located beneath the bottom sections of the encasements and also identical members that extend along the longitudinal axis 203 at the top flat portion of the top section of the encasement. For example, threaded rod 230 (FIG. 4) extends through central aperture 231 of member 223 (FIG. 5) with a hexagonally shaped nut 232 threaded onto the bottom of rod 230 thereby supporting the encasement. Similarly, a second rod 233 (FIG. 6) is attached to the member 222 thereby cooperatively supporting with rod 230 the pair of encasements.

Threaded rods 230 and 233 (FIG. 6) extend through respectively members 240 and 241 which rest atop cross members 220 and 221 with hexagonally shaped nuts 245 threaded onto rods 230 and 233 against members 240 and 241 thereby forcing the upper sections of the encasements downwardly against the lower sections of the encasements thereby holding the encasements together.

The upwardly facing ends 251 of the bottom sections of the encasements (FIG. 6) are positioned immediately beneath the downwardly facing ends 252 of the upper sections of the encasements with mortar 250 positioned therebetween thereby securing the top sections and bottom sections of the encasements together. The mortar positioned between the top sections and bottom section keep the sections together in alignment and provide protection from the environment against the electrical wires located within the encasement. Alternatively, the top sections and bottom sections may be initially poured to provide an integral one piece construction. In other words, the top section and bottom section of the concrete encasement are one piece and are integral.

A horizontally extending conduit 269 (FIG. 8) includes a pair of encasements 270 and 271. Concrete encasement 270 extends along the longitudinal axis 274 whereas concrete encasement 271 extends along the longitudinal axis 275 with axis 275 being arranged at an angle with respect to axis 274. In the embodiment shown in FIG. 8, the angle between axis 275 and 274 is 90 degrees thereby forming a horizontally extending elbow connection between the pair of concrete encasements 270 and 271. Encasement 270 has an enlarged curved female end 272 providing a receiving recess to receive the smaller curved diametered end 273 of encasement 271.

Each encasement 270 and 271 are constructed in the same manner as the encasements shown in FIGS. 4-7 in that each encasement includes a first section and second section having cross members embedded in the ends opposite of ends 272 and 273 for attachment to adjacent concrete encasements. Thus, a pair of rods may be used to support the end of encasement 270 opposite of end 272 in a manner previously described. Assuming encasements 270 and 271 extend in a horizontal direction then additional vertically extending externally threaded rods attach the plates extending across and embedded in the end opposite of end 273 of encasement 271 with the rods thereby securing encasement 271 suspendedly from a ceiling or other structure. Encasements 270 and 271 are identical in configuration with the exception that one end of encasement 270 is provided with a female end to receive the male end of encasement 271.

While a particular system and a method of use have been shown and described, it is intended in this specification to cover all equivalent systems and methods of use which would reasonably occur to those of skill in the building and electrical conduit supply arts. The system and method described may have uses in other specialized environments where enhanced protection of electrical service conduits is deemed necessary.

While the invention has been illustrated and described in detail in the drawings and foregoing description, the same is to be considered as illustrative and not restrictive in character, it being understood that only the preferred embodiment has been shown and described and that all changes and modifications that come within the spirit of the invention are desired to be protected.

What is claimed is:

1. A conduit for electrical lines suspendable from a ceiling or other structure comprising:
   a first concrete encasement with a longitudinal axis and including a bottom section and a mating top section joinable together forming an enclosure for holding electrical lines, said bottom section having an outer flat bottom portion and said top section having an outer flat top portion allowing said encasement to be stacked atop another identical encasement, said bottom section includes a first support extending lengthwise across said longitudinal axis and fixed to said bottom portion of said bottom section, said top section includes a second support extending lengthwise across said longitudinal axis and fixed to said top portion of said top section, said top section and said bottom section are identical in construction and configuration allowing interchange of sections;
   a cradle including a third support extending lengthwise along said axis and fixed to said first support and a fourth support extending lengthwise along said longitudinal axis and fixed to said second support; and
   a hanger connected to said third support and said fourth support extending upwardly to mount said cradle and said encasement to a ceiling or other structure; and wherein:
   said hanger includes a pair of rods with said encasement located therebetween, said rods connected to said third support and said fourth support;
   said first support and said second support include a plurality of holes into which respectively said flat bottom portion and said flat top portion extend limiting movement between said bottom section and said first support and between said top section and said second support.

2. The conduit of claim 1 wherein:
   said rods extend through said third support and said fourth support and are fixed thereto supporting said encasement.

3. The conduit of claim 1 wherein:
   said third support is lower in elevation and beneath said first support and located outwardly of said bottom section forming a channel sized to receive said bottom section of said enclosure.

4. The conduit of claim 3 wherein:
   said top section and said bottom section are mortared together in alignment, said encasement includes a plurality of top sections and bottom sections identical to said top section and said bottom section and having adjacent ends mortared together in alignment and supported by said cradle and hanger.

5. The conduit of claim 4 and further comprising:
   a tube positioned within said concrete encasement and extending along said longitudinal axis through said plurality of top sections and bottom sections for holding electrical lines.

* * * * *